US006469736B1

United States Patent
Suda

(10) Patent No.: US 6,469,736 B1
(45) Date of Patent: *Oct. 22, 2002

(54) VIDEO CAMERA WITH INTEGRATED SIGNAL PROCESSING

(75) Inventor: Hirofumi Suda, Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,231

(22) Filed: May 27, 1997

Related U.S. Application Data

(63) Continuation of application No. 08/321,401, filed on Oct. 11, 1994, now abandoned.

(30) Foreign Application Priority Data

Oct. 15, 1993 (JP) .............................................. 5-282025

(51) Int. Cl.⁷ ........................... H04N 5/225; H04N 9/04
(52) U.S. Cl. .................................. 348/207.99
(58) Field of Search ............................... 348/207, 224, 348/229; 395/275, 375, 550; 340/825.5; 358/337; 396/99, 125

(56) References Cited

U.S. PATENT DOCUMENTS 4,739,323 A * 4/1988 Miesterfeld et al. ..... 340/825.5
5,121,218 A 6/1992 Miyake et al. ............... 358/337
5,302,997 A * 4/1994 Cocca .......................... 396/99
5,345,264 A * 9/1994 Murata et al. ............... 348/235

FOREIGN PATENT DOCUMENTS

EP 0446647 9/1991 .......... H04N/5/232
JP 0649252 * 4/1995

OTHER PUBLICATIONS

Patent Abstracts of Japan No. JP59191647, vol. 9, No. 54.

Patent Abstracts of Japan No. JP3083124, vol. 15, No. 255.

Patent Abstracts of Japan No. JP3196218, vol. 15, No. 462.

* cited by examiner

Primary Examiner—Aung S. Moe
(74) Attorney, Agent, or Firm—Robin, Blecker & Daley

(57) ABSTRACT

A video camera is provided with a processing circuit for processing a picked-up image signal outputted from an image sensor, a control circuit for controlling an image pickup action by transferring signals with the processing circuit, a serial communication circuit disposed between the control circuit and the processing circuit for controlling the transfer of signals between the control circuit and the processing circuit, and a change-over circuit for changing over an order of transmission of communication data within one unit to be transmitted by the serial communication circuit.

28 Claims, 2 Drawing Sheets

VIDEO CAMERA WITH INTEGRATED SIGNAL PROCESSING

This is continuation application under 37 CFR 1.62 of prior application Ser. No. 08/321,401, filed Oct. 11, 1994 now abandoned.

BACKGROUND OF THE INVENTION

1. Field of the Invention

This invention relates to a video camera which controls an image pickup action by serial communication.

2. Description of the Related Art

The control operation of every electronic apparatus has recently come to be carried out by using a microcomputer. In the case of a video camera, a control device of it includes a microcomputer. The control device is generally arranged to conduct serial communication with each applicable processing circuit for various purposes. For example, the constant of a signal processing circuit is changed. Data is taken into the control device from a white balance circuit, a light measuring circuit, an automatic focusing circuit, etc. An image pickup action is controlled according to such data.

FIG. 1 is a block diagram showing by way of example the arrangement of the conventional video camera. The video camera includes a focusing lens 1 which is arranged to be movable in the direction of an optical axis. An iris 2 is arranged in rear of the focusing lens 1 to adjust the quantity of incident light. An image sensor 3 is arranged in rear of the iris 2 to have an optical image of an object of shooting formed thereon and to photo-electrically convert the optical image into a video signal. The image sensor 3 is connected to a sample-and-hold (hereinafter referred to as CDS) circuit 4 which is arranged to sample and hold the video signal obtained from the image sensor 3. To the CDS circuit 4 is connected an analog-to-digital (A/D) converter 5 which is arranged to convert the output of the CDS circuit 4 into a digital video signal. The A/D converter 5 is connected to a signal processing circuit 6, a light measuring circuit 7 and an automatic focusing circuit 8 which are connected in parallel to each other. The signal processing circuit 6 is arranged to set a circuit gain and to convert the video signal into a TV signal by forming luminance and chrominance signals through various processes such as a gamma correction process, a blanking process, a synchronizing signal adding process, etc. The light measuring circuit 7 is arranged to detect the quantity of light obtained when an image is picked up. The automatic focusing circuit 8 is arranged to extract a focus signal, such as a high frequency component of the video signal.

The video camera has a microcomputer 12 arranged to perform overall control over an image pickup action. To the microcomputer 12 are connected a clock generator 25 which is arranged to output clock pulses, an iris driver 9 arranged to control the iris 2, and a motor driver 10. To the motor driver 10 is connected a motor 11 which is arranged to drive and move the focusing lens 1. Further, the microcomputer 12 is provided with a switch 21 which is arranged to perform switching between terminals R and S. To a common terminal of the switch 21 is connected a common terminal of another switch 28 which is arranged to perform switching between terminals A and D. A switch 24 has its common terminal connected to the terminal D of the switch 28 and is arranged to perform switching between terminals R1 and S1. The connecting relation between each of these switches and other parts of the video camera is as shown in FIG. 1. The switching actions of the switches 21, 28 and 24 are controlled by the microcomputer 12.

The signal processing circuit 6 includes a control shift register 13. The light measuring circuit 7 includes a control shift register 14 and a data shift register 15. The automatic focusing circuit 8 includes a control shift register 16 and a data shift register 17. The terminal R1 of the switch 24 is connected to the data terminal of the data shift register 17 and that of the data shift register 15. The terminal S1 of the switch 24 is connected to the data terminal of the control shift register 16, that of the control shift register 14 and that of the control shift register 13.

The terminal A of the switch 28 is connected to one of the data terminals of an address shift register 20. The output terminal of the clock generator 25 is connected to the control terminal of the address shift register 20. To the address shift register 20 are connected the input terminals of a decoder 19. The respective control terminals of the control shift register 13, the control shift register 14, the data shift register 15, the control shift register 16 and the data shift register 17 are connected to the output terminals of the decoder 19.

The conventional video camera which is arranged as described above operates as described below:

The microcomputer 12 transfers data to the signal processing circuit 6 in the following manner: In this case, the microcomputer 12 switches the connecting position of the switch 21 to the terminal S and that of the switch 28 to the terminal A. An address signal which indicates an address of the control shift register 13 is transferred from the microcomputer 12 to the address shift register 20 in accordance with the clock pulses applied from the clock generator 25. The decoder 19 reads the address of the control shift register 13 by decoding the address signal outputted from the address shift register 20 and supplies a setting signal to the control shift register 13 in such a way as to set the control shift register 13 into a shiftable state.

Under this condition, the microcomputer 12 switches connecting position of the switch 28 to its terminal D and that of the switch 24 to its terminal S1. Then, in accordance with the clock pulses from the clock generator 25, control data is transferred from the microcomputer 12 to the control shift register 13 which has been set into the shiftable state. Then, at the signal processing circuit 6, a TV signal is prepared by setting the circuit gain at an optimum value on the basis of the control data transferred from the microcomputer 12 to the control shift register 13. The TV signal thus obtained is outputted.

A data transferring action to be performed between the microcomputer 12 and the light measuring circuit 7 is next described as follows: The connecting position of the switch 21 is switched to the terminal S and that of the switch 28 is switched to the terminal A also in this instance. The microcomputer 12 then transfers an address signal which indicates an address of the control shift register 14 to the address shift register 20, according to the clock pulses coming from the clock generator 25. The decoder 19 decodes the address signal outputted from the address shift register 20 to read the address of the control shift register 14. The decoder 19 then supplies a setting signal to the control shift register 14 to set the control shift register 14 into a shiftable state.

Under this condition, the connecting position of the switch 28 is switched to the terminal D and that of the switch 24 is switched to the terminal S1. Then, light-measuring-position data is transferred from the microcomputer 12 to the control shift register 14 which has been set in the shiftable state, in accordance with the clock pulses coming from the clock generator 25. Upon receipt of the light-measuring-position data, the light measuring circuit 7 decides a light measuring position within an image plane on the basis of the light-measuring-position data transferred to the control shift register 14 from the microcomputer 12. A digital video signal corresponding to the light measuring position thus decided is integrated. The result of the integration process is stored in the data shift register 15 as light measurement data.

Next, the connecting position of the switch 28 is switched to the terminal A while the connecting position of the switch 21 remains at the terminal S. The microcomputer 12 then transfers an address signal indicating an address of the data shift register 15 to the address shift register 20 in accordance with the clock pulses coming from the clock generator 25. The decoder 19 reads the address of the data shift register 15 by decoding the address signal outputted from the address shift register 20 and supplies a setting signal to the data shift register 15 to set the data shift register 15 into a shiftable state. Under this condition, the connecting position of the switch 21 is switched to the terminal R, that of the switch 28 is switched to the terminal D and that of the switch 24 is switched to the terminal R1. The microcomputer 12 then inputs the light measurement data from the data shift register 15. The iris driver 9 is driven on the basis of the light measurement data thus obtained. As a result, the aperture of the iris 2 is controlled and adjusted to an optimum position according to the light measurement data.

The transfer of data between the microcomputer 12 and the automatic focusing circuit 8 is effected in the following manner: The connecting position of the switch 21 is switched to the terminal S also in this instance. The connecting position of the switch 28 is switched to the terminal A. The microcomputer 12 transfers an address signal which indicates an address of the control shift register 16 to the address shift register 20 according to the clock pulses coming from the clock generator 25. The decoder 19 reads the address of the control shift register 16 by decoding the address signal outputted from the address shift register 20. The decoder 19 then supplies a setting signal to the control shift register 16 to set the control shift register 16 into a shiftable state.

Under that condition, the connecting position of the switch 28 is switched to the terminal D and that of the switch 24 is switched to the terminal S1. The microcomputer 12 then transfers focus-detecting-position data to the control shift register 16 according to the clock pulses from the clock generator 25. The automatic focusing circuit 8 decides a focus detecting position within the image plane on the basis of the focus-detecting-position data transferred from the microcomputer 12. The automatic focusing circuit 8 then stores in the data shift register 17 a focus detection signal obtained at the focus detecting position as focus detection data.

Then, the connecting position of the switch 28 is switched to the terminal A while that of the switch 21 remains at the terminal S. The microcomputer 12 transfers an address signal indicating an address of the data shift register 17 to the address shift register 20 according to the clock pulses coming from the clock generator 25. The decoder 19 reads the address of the data shift register 17 by decoding the address signal outputted from the address shift register 20. The decoder 19 then supplies a setting signal to the data shift register 17 to set the data shift register 17 into a shiftable state. Under this condition, the connecting position of the switch 21 is switched to the terminal R, that of the switch 28 is switched to the terminal D and that of the switch 24 is switched to the terminal R1. The microcomputer then inputs the focus detection data from the data shift register 17. The motor driver 10 is driven on the basis of the focus detection data. The focusing lens 1 is moved along the optical axis so as to be adjusted to an optimum in-focus position.

However, in the case of the video camera described above, the data inputting and outputting directions to and from the data shift registers 15 and 17 and the control shift register 13, 14 and 16 are fixed. The direction of flow of data, i.e., whether the communication is to be started from the most significant bit (MSB) of data or from the least significant bit (LSB) is, therefore, fixedly decided in one direction depending on the arrangement of hardware. If the video camera is arranged to use an IC, therefore, the communication must be conducted in the fixed direction, so that if the video camera is arranged to use as a control device one of general purpose microcomputers which have different flows of serial data from each other, a usable microcomputer must be selected from a limited kinds of microcomputers.

Further, in the case of the conventional video camera described above, the speed at which data is inputted to and outputted from the data shift registers 15 and 17 and the control shift registers 13, 14 and 16 depends on the processing speed of the microcomputer 12. Therefore, if a microcomputer of a slow processing speed is employed as the control device, a long period of time is required for inputting and outputting data to and from the data shift registers 15 and 17 and the control shift registers 13, 14 and 16. The image pickup action of the video camera then would be affected by the slow processing speed.

SUMMARY OF THE INVENTION

This invention is contrived to solve the problems of the video camera described above. It is a first object of this invention to provide a video camera in which the direction of flow of data is arranged to be variable in such a manner that the flow of the data can be set either to begin with the MSB (most significant bit) of the data or to begin with the LSB (least significant bit) of the data.

It is a second object of this invention to provide a video camera which is arranged to permit use of a microcomputer of a low processing speed as a control device without lowing the performance of the video camera.

To attain the first object, a video camera arranged as a preferred embodiment of this invention includes processing means for processing a picked-up image signal outputted from image pickup means, control means for controlling an image pickup action of the image pickup means by transferring signals with the processing means, serial communication means disposed between the control means and the processing means for controlling the transfer of signals between the processing means and the control means, and change-over means for changing over an order of transmission of communication data within one unit to be transmitted by the serial communication means.

To attain the second object, a video camera arranged as another preferred embodiment of this invention includes processing means for processing a picked-up image signal outputted from image pickup means, control means for controlling an image pickup action of the image pickup means by transferring signals with the processing means, serial communication means disposed between the control means and the processing means for controlling the transfer of signals between the processing means and the control means, buffer means disposed midway in the serial communication means and arranged to store signal data, and speed change-over means for changing over the speed of data transmission by making the speed of data transmission to be effected on the side of the control means relative to the buffer means different from the speed of data transmission to be effected on the side opposite to the control means.

With the embodiment arranged in this manner, the control means controls the image pickup action of the video camera by transferring signals with the processing means which processes a picked-up image signal outputted from the image pickup means. In this instance, the serial communication means which is disposed between the control means and the processing means controls the transfer of signals between the processing means and the control means. The order of transmission of data within one unit to be transmitted by the serial communication means is changed from one order of transmission over to another order as necessary. By this change-over, the direction of flow of data transmission by the serial communication means is selectively decided as to whether the transmission is allowed to begin with the MSB of the data or to begin with the LSB of the data.

The control means is thus arranged to control the image pickup action of the video camera with signals transferred between the control means and the processing means. In this instance, the transfer of signals between the processing means and the control means is controlled by the serial communication means disposed between the control means and the processing means. Then, the speed of data transmission to be effected on the side opposite to the control means relative to the buffer means which is disposed midway in the serial communication means is set by the speed change-over means at a higher speed than the speed of data transmission to be effected on the side of the control means.

These and other objects an d features of this invention will become apparent from the following detailed description of embodiments thereof taken in conjunction with the accompanying drawings.

DETAILED DESCRIPTION OF THE PREFERRED EMBODIMENTS

Figure 1:
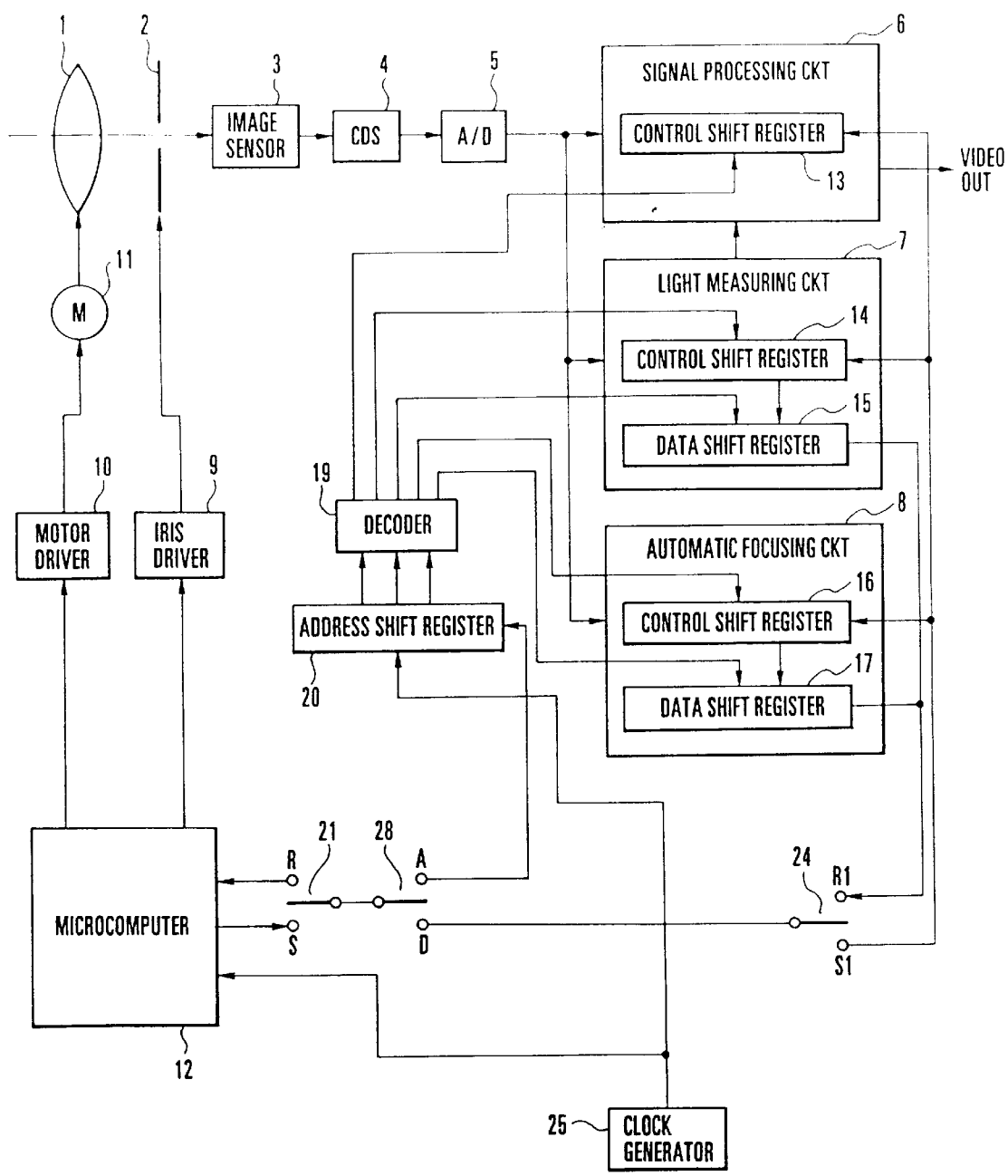
FIG. 1 is a block diagram showing by way of example the arrangement of the conventional video camera.
Figure 2:
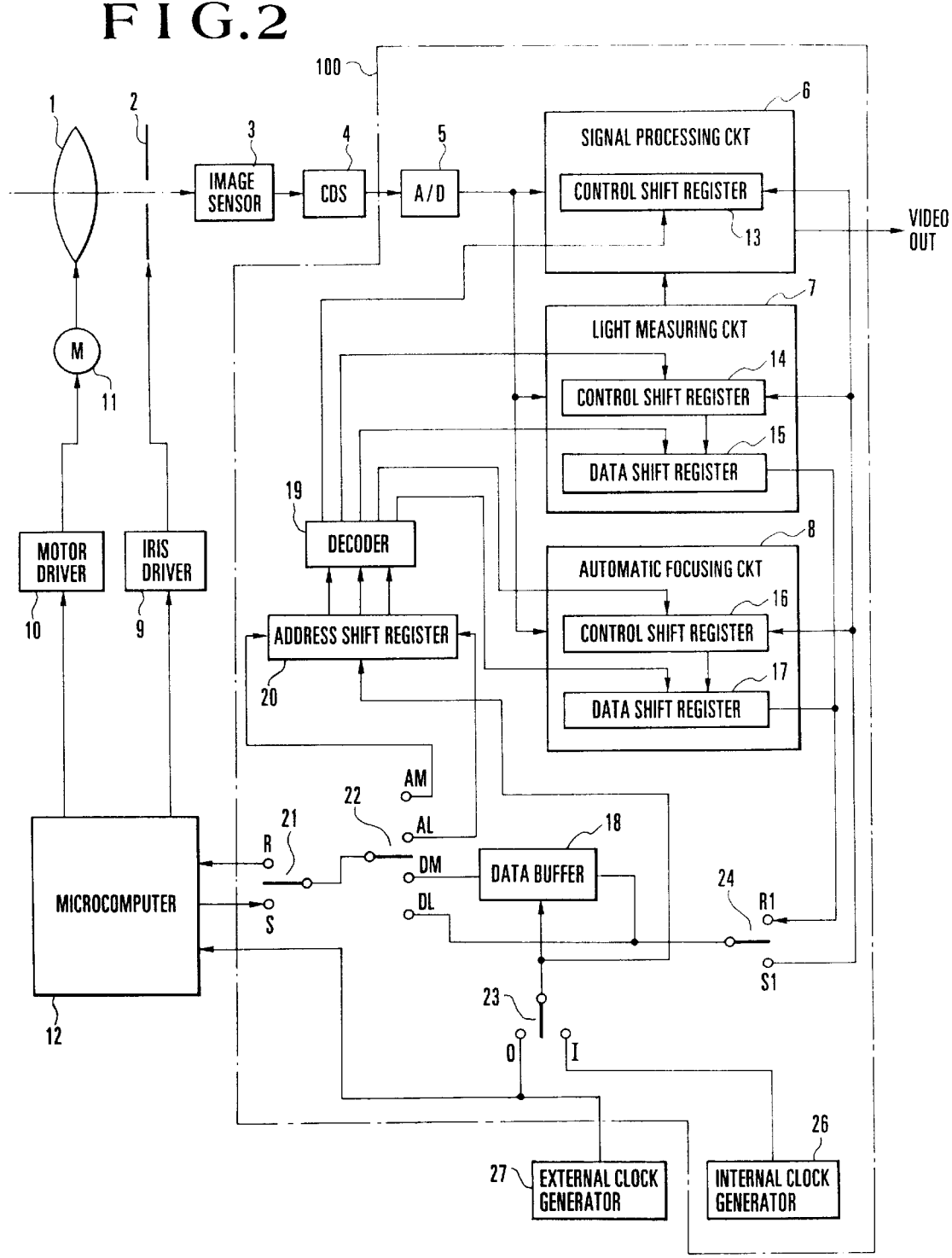
FIG. 2 is a block diagram showing a video camera arranged as an embodiment of this invention.

One embodiment of this invention is described below with reference to FIG. 2, which is a block diagram showing the arrangement of the embodiment:

In FIG. 2, all component parts arranged in the same manner as those of the conventional video camera shown in FIG. 1 are indicated by the same reference numerals and the details of them are omitted from the following description. In the case of this embodiment, a switch 22 is mounted in place of the switch 28 shown in FIG. 1. The common terminal of the switch 22 is connected to the common terminal of the switch 21. The switch 22 is provided with terminals AM, AL, DM and DL. The terminals AM and AL are connected respectively to two data terminals of the address shift register 20. The terminal DL is connected to the common terminal of the switch 24. These switches are connected to other circuits of the video camera as shown in FIG. 2 and are arranged to operate. under the control of the microcomputer 12.

An external clock generator 27 is arranged in place of the clock generator 25 shown in FIG. 1. In addition to the external clock generator 27, there is provided an internal clock generator 26 which is arranged to output clock pulses having a much higher speed than the speed of clock pulses outputted from the external clock generator 27. This embodiment is provided further with a data buffer 18 and a switch 23. The data buffer 18 has two data terminals which are connected respectively to the terminal DM of the switch 22 and the common terminal of the switch 24. The control terminal of the data buffer 18 is connected to the common terminal of the switch 23 and also to the control terminal of the address shift register 20. The switch 23 is provided with terminals O and I. The terminal O is connected to the external clock generator 27. The terminal I is connected to the internal clock generator 26. The switch 23 is also arranged to operate under the control of the microcomputer 12. Except these parts, all other parts of the embodiment are arranged in the same manner as the video camera which has already been described in the foregoing with reference to FIG. 1 and thus require no further description.

With the embodiment arranged in this manner, in the case of transfer of data in the direction of data flow in which the transfer begins with the MSB of the data, the embodiment operates as follows:

When control data is to be transferred to the control shift register 13 of the signal processing circuit 6, the microcomputer 12 first switches the connecting position of the switch 21 to the terminal S, that of the switch 22 to the terminal AM and that of the switch 23 to the terminal O. The microcomputer 12 then transfers an address signal indicating an address of the control shift register 13 to the address shift register 20 according to the clock pulses coming from the external clock generator 27. As a result of this transfer, the control shift register 13 of the signal processing circuit 6 is set into a shiftable state by a setting signal outputted from the decoder 19, in the same manner as the video camera shown in FIG. 1.

Next, the connecting position of the switch 22 is switched to the terminal DM while that of the switch 21 remains at the terminal S and that of the switch 23 remains at the terminal O. The microcomputer 12 then transfers, according to the clock pulses from the external clock generator 27, control data for the control shift register 13 to the data buffer 18.

After that, the connecting position of the switch 24 is switched to the terminal S1 and that of the switch 23 is switched to the terminal I. Then, the control data stored in the data buffer 18 is transferred at a high speed from the data buffer 18 to the control shift register 13 according to the clock pulses coming from the internal clock generator 26.

In a case where light-measuring-position data for designating a light measuring position within the image plane is to be transferred to the light measuring circuit 7 and light measurement data which corresponds to the light measuring position designated is to be inputted to the microcomputer 12, the embodiment operates as follows: The connecting position of the switch 21 is first switched to the terminal S, that of the switch 22 is switched to the terminal AM and that of the switch 23 is switched to the terminal O. The microcomputer 12 then transfers an address signal indicating an address of the control shift register 14 to the address shift register 20 according to the clock pulses coming from the external clock generator 27. As a result of this transfer, a setting signal is outputted from the decoder 19 to set the control shift register 14 into a shiftable state.

After the above action, the connecting position of the switch 22 is switched to the terminal DM, while that of the switch 21 remains at the terminal S and that of the switch 23 remains at the terminal O. The microcomputer 12 then transfers light-measuring-position data for the control shift register 14 to the data buffer 18 according to the clock pulses coming from the external clock generator 27. The connecting position of the switch 24 is then switched to the terminal S1 and that of the switch 23 is switched to the terminal I. Then, the light-measuring-position data is transferred from the data buffer 18 to the control shift register 14 of the light measuring circuit 7 at a high speed according to the clock pulses coming from the internal clock generator 26. The light measuring circuit 7 then stores applicable light measurement data in the data shift register 15 according to the light-measuring-position data transferred.

With the light measurement data thus stored, the connecting position of the switch 22 is switched to the terminal AM and that of the switch 23 is switched to the terminal O, while that of the switch 21 remains at the terminal S. Under this condition, the microcomputer 12 transfers an address signal indicating an address of the data shift register 15 to the address shift register 20 according to the clock pulses coming from the external clock generator 27. With the address signal thus transferred, the decoder 19 sends out a setting signal to set the data shift register 15 into a shiftable state.

Under this condition, the connecting position of the switch 23 is switched to the terminal I and that of the switch 24 is switched to the terminal R1. Then, the light measurement data stored in the data shift register 15 is transferred to the data buffer 18 at a high speed according to the clock pulses coming from the internal clock generator 26. Next, the connecting position of the switch 21 is switched to the terminal R, that of the switch 22 is switched to the terminal DM and that of the switch 23 is switched to the terminal O. The light measurement data is then transferred from the data buffer 18 to the microcomputer 12 according to the clock pulses coming from the external clock generator 27. Then, in the same manner as the conventional video camera described in the foregoing, the aperture of the iris 2 is controlled to ensure optimum light measurement on the basis of the light measurement data in accordance with an instruction given from the microcomputer 12.

In a case where focus-detecting-position data is to be transferred to the automatic focusing circuit 8 and focus detection data corresponding to the focus-detecting-position data is to be inputted to the microcomputer 12, the embodiment operates as follows: The connecting position of the switch 21 is first switched to the terminal S, that of the switch 22 is switched to the terminal AM and that of the switch 23 is switched to the terminal O. The microcomputer 12 then transfers an address signal which indicates an address of the control shift register 16 to the address shift register 20 according to the clock pulses coming from the external clock generator 27. As a result of this transfer, a setting signal is supplied from the decoder 19 to set the control shift register 16 into a shiftable state.

Under this condition, the connecting position of the switch 22 is switched to the terminal DM, while that of the switch 21 remains at the terminal S and that of the switch 23 remains at the terminal O. The microcomputer 12 then transfers to the data buffer 18, according to the clock pulses from the external clock generator 27, focus-detecting-position data which is to be sent to the control shift register 16. After the transfer to the data buffer 18, the connecting position of the switch 24 is switched to the terminal S1 and that of the switch 23 is switched to the terminal I. The focus-detecting-position data is then transferred from the data buffer 18 to the control shift register 16 of the automatic focusing circuit 8 at a high speed according to the clock pulses coming from the internal clock generator 26. At the automatic focusing circuit 8, applicable focus detection data is stored in the data shift register 17 on the basis of the focus-detecting-position data transferred.

Then, the connecting position of the switch 22 is switched to the terminal AM and that of the switch is switched to the terminal O, while that of the switch 21 remains at the terminal S. The microcomputer 12 transfers an address signal indicating an address of the data shift register 17 to the address shift register 20 according to the clock pulses coming from the external clock generator 27. The decoder 19 then sends a setting signal to the data shift register 17 to set the data shift register 17 into a shiftable state.

Under this condition, the connecting position of the switch 23 is switched to the terminal I and that of the switch 24 is switched to the terminal R1. Then, the focus detection data stored in the data shift register 17 of the automatic focusing circuit 8 is transferred to the data buffer 18 at a high speed according to the clock pulses coming from the internal clock generator 26. After that, the connecting position of the switch 21 is switched to the terminal R, that of the switch 22 is switched to the terminal DM and that of the switch 23 is switched to the terminal O. The focus detection data is then transferred from the data buffer 18 to the microcomputer 12 according to the clock pulses coming from the external clock generator 27. The microcomputer 12 then issues an instruction on the basis of the focus detection data to cause the focusing lens 1 to be controlled and moved to an in-focus position in the same manner as in the case of the conventional video camera described in the foregoing.

Other actions of this embodiment are performed in the same manner as the conventional video camera described in the foregoing.

In the case of each of the actions described above, data is transferred beginning with the MSB of the data. However, the direction (order) of transfer of data from the microcomputer 12 to the address shift register 20 and the data buffer 18 can be inverted by switching the connecting position of the switch 22 to the terminal AL instead of the terminal AM and to the terminal DL instead of the terminal DM. With the switching performed in this manner, the transfer of data between the data buffer 18 and each of the control shift registers and data shift registers comes to begin with the LSB of the data. Any of systems using these different modes of data transfer, therefore, can be used without any circuit modification.

The invented arrangement described thus enables the embodiment to transfer data from the microcomputer 12 to the data buffer 18 and to the address shift register 20 either beginning with the MSB or beginning with the LSB of the data. The transfer of data from the data buffer 18 to the microcomputer 12 also can be performed beginning with the MSB or the LSB as desired, so that any of microcomputers of different kinds can be employed as the control device of the embodiment. Further, the embodiment is arranged to permit the transfer of data from the data buffer 18 to each of the control shift registers and the data shift registers and vice versa to be carried out at a high speed according to the clock pulses coming from the internal clock generator 26. This arrangement permits use of a microcomputer of a low processing speed, so that the video camera can be manufactured at a lower cost.

In the case of the embodiment, as described above, the order of transmission (transfer) of communication data within one unit to be transmitted by serial communication means can be changed over by change-over means if necessary. The direction of flow of data to be transmitted (transferred) by the serial communication means, i.e., whether the flow should begin with the MSB or LSB of the data, can be selected as desired. Therefore, any of general purpose computers of varied kinds is usable to improve functions without any hardware modification.

Further, speed change-over means enables the embodiment to change the speed of data transmission over to a higher speed for data transmission to be effected on the side opposite to the control means relative to the buffer means in the serial communication means. The speed change-over means thus permits use of a microcomputer of a low processing speed for reduction in manufacturing cost without lowering the performance of the video camera. It is also a great advantage that the speed change-over means enables the embodiment to be better matched with other apparatuses or circuits.

Further, a range 100 indicated by a one-dot-chain line in FIG. 2 can be configured into a one-chip IC as a signal processing IC for the video camera. The IC can be arranged to have a high performance, to be capable of efficiently performing control, to be highly compatible with other microcomputers and to have a wide universal applicability.

Further, since the embodiment is arranged such that the processes of the microcomputer 12 are controlled to be performed at a low speed by the low-speed external clock pulses and the signal processing system is controlled to operate at a high speed by the high-speed internal clock pulses, the parts within the signal processing IC 100 can be driven at a maximum speed irrespective of the performance of external devices. It is also possible to have the microcomputer 12 conversely arranged to be driven by the high-speed clock pulses.

What is claimed is:

1. A video camera comprising:
    processing means for processing a picked-up image signal outputted from image pickup means;
    control means for controlling an image pickup operation of said image pickup means and an operation of said processing means by transferring signals with said processing means;
    serial communication means, disposed between said control means and said processing means for controlling the transfer of signals between said processing means and said control means; and
    change-over means, as an interface of said serial communication means, for changing over an order of transmission of communication data within one block unit and a clock frequency for transmission of communication data to be transmitted by said serial communication means by using a common data buffer memory, wherein said processing means, serial communication means and change-over means are integrated on a one-chip integrated circuit for a signal video camera.

2. A video camera according to claim 1, wherein said control means is arranged to send, by using said serial communication means, to said processing means, address information and control information indicative of inputting of data and to receive, from said processing means, data formed by said processing means.

3. A video camera according to claim 2, wherein the address information is provided for selecting from a plurality of functions of said processing means a function to be carried out, the control information is provided for indicating an action to be carried out by the function selected, and the data from said processing means is output data formed as a result of the action of the function selected.

4. A video camera according to claim 3, wherein said control means is a microcomputer arranged to control the video camera on the basis of said output data.

5. A video camera according to claim 4, wherein the plurality of functions of said processing means include focus detecting means.

6. A video camera according to claim 5, wherein the control information is provided for indicating a focus detecting position within an image plane, and the data from said processing means is a focus detecting signal obtained in the focus detecting position.

7. A video camera according to claim 4, wherein the plurality of functions of said processing means include light measuring means.

8. A video camera according to claim 6, wherein the control information is provided for indicating a light measuring position within an image plane, and the data from said processing means is a measured light value obtained in the light measuring position.

9. A video camera according to claim 1, wherein said change-over means is arranged to change over the order of transmission of the communication data between the transmission beginning with the MSB of the data and the transmission beginning with the LSB of the data.

10. A video camera comprising:
    processing means for processing a picked-up image signal outputted from image pickup means;
    control means for controlling an image pickup operation of said image pickup means and an operation of said processing means by transferring signals with said processing means;
    serial communication means disposed between said control means and said processing means for controlling the transfer of signals between said processing means and said control means;
    buffer means disposed midway in said serial communication means and arranged to store signal data; and
    change-over means, as an interface of said serial communication means, for changing over an order and a speed of data transmission between said processing means and said control means by temporally storing the signal data in said buffer means, wherein said processing means, said buffer means and change-over means are integrated on a one-chip integrated circuit for a signal processing of said video camera.

11. A video camera according to claim 10, wherein said control means is arranged to send, by using said serial communication means, to said processing means, address information and control information indicative of inputting of data and to receive, from said processing means, data formed by said processing means.

12. A video camera according to claim 11, wherein the address information is provided for selecting from a plurality of functions of said processing means a function to be carried out, the control information is provided for indicating an action to be carried out by the function selected, and the data from said processing means is output data formed as a result of the action of the function selected.

13. A video camera according to claim 11, wherein said control means is a microcomputer arranged to control the video camera on the basis of said output data.

14. A video camera according to claim 13, wherein the plurality of functions of said processing means include focus detecting means.

15. A video camera according to claim 14, wherein the control information is provided for indicating a focus detecting position within an image plane, and the data from said processing means is a focus detecting signal obtained in the focus detecting position.

16. A video camera according to claim 13, wherein the plurality of functions of said processing means include light measuring means.

17. A video camera according to claim 15, wherein the control information is provided for indicating a light measuring position within an image plane, and the data from said processing means is a measured light value obtained in the light measuring position.

18. A video camera according to claim 10, wherein the data transmission to be effected on the side of said control means relative to said buffer means is driven by a clock which differs from a clock by which the data transmission to be effected on the side opposite to said control means is driven wherein said processing means and change-over means are integrated on one-chip circuit.

19. A video camera according to claim 18, further comprising a first clock provided for the data transmission between said control means and said buffer means, and a second clock provided for the data transmission between said buffer means and said processing means, at least one of said first and second clocks being an external clock.

20. A signal processing integrated circuit for a video camera, comprising:
   processing means for processing a picked-up image signal;
   serial communication means for transferring signals between said processing means and external control means; and
   change-over means for, as an interface of said serial communication means, changing over an order and a rate of transmission of communication data within one unit to be transmitted by said serial communication means by using common data buffer means, wherein said processing means, communication means and change-over means are integrated on a one-chip integrated circuit for a signal processing of said video camera.

21. An integrated circuit according to claim 20, wherein said processing means includes focus detecting means.

22. An integrated circuit according to claim 20, wherein said processing means includes light measuring means.

23. An integrated circuit according to claim 20, wherein said change-over means is arranged to change over the order of transmission of communication data between the transmission beginning with the MSB of the data and the transmission beginning with the LSB of the data.

24. A signal processing integrated circuit for a video camera, comprising:
   processing means for processing a picked-up image signal;
   serial communication means for transferring signals between said processing means and external control means;
   common buffer means disposed midway in said serial communication means and arranged to store signal data; and
   change-over means, as an interface of said serial communication means, capable of varying a speed and turning an order of data transmission between the transmission to be effected before said common buffer means and the transmission to be effected after said common buffer means wherein said processing means, said buffer means and speed change-over means are integrated on a one-chip integrated circuit.

25. An integrated circuit according to claim 24, wherein said processing means includes focus detecting means.

26. An integrated circuit according to claim 24, wherein said processing means includes light measuring means.

27. An integrated circuit according to claim 24, wherein the data transmission to be effected on the side of said control means relative to said common buffer means is driven by a clock which differs from a clock by which the data transmission to be effected on the side opposite to said control means is driven.

28. An integrated circuit according to claim 27, further comprising a first clock provided for the data transmission between said control means and said common buffer means, and a second clock provided for the data transmission between said common buffer means and said processing means, at least one of said first and second clocks being an external clock.

* * * * *

UNITED STATES PATENT AND TRADEMARK OFFICE
CERTIFICATE OF CORRECTION

PATENT NO. : 6,469,736 B1
DATED : October 22, 2002
INVENTOR(S) : Hirofumi Suda

It is certified that error appears in the above-identified patent and that said Letters Patent is hereby corrected as shown below:

Column 11,
Line 7, delete "claim 15" and insert -- claim 16 --.

Signed and Sealed this

Twenty-eighth Day of October, 2003

JAMES E. ROGAN
*Director of the United States Patent and Trademark Office*